A. M. ALLEN.
Velocipede.

No. 223,691.   Patented Jan. 20, 1880.

Witnesses.
Otto Ohrfeland
William Miller.

Inventor
Arthur M. Allen
by
Van Santvoord & Hauff
his attorneys.

UNITED STATES PATENT OFFICE.

ARTHUR M. ALLEN, OF NEW YORK, N. Y.

VELOCIPEDE.

SPECIFICATION forming part of Letters Patent No. 223,691, dated January 20, 1880.

Application filed May 14, 1879.

*To all whom it may concern:*

Be it known that I, ARTHUR M. ALLEN, of the city, county, and State of New York, have invented a new and useful Improvement in Velocipedes, which improvement is fully set forth in the following specification, reference being had to the accompanying drawings, in which—

Figure 1:
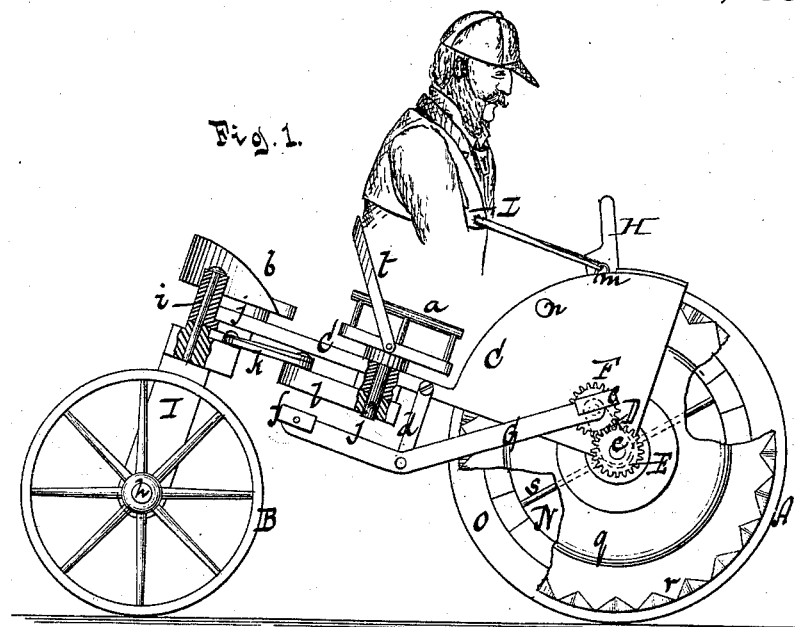
Figure 5:
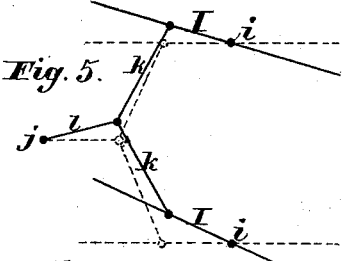
Figure 2:
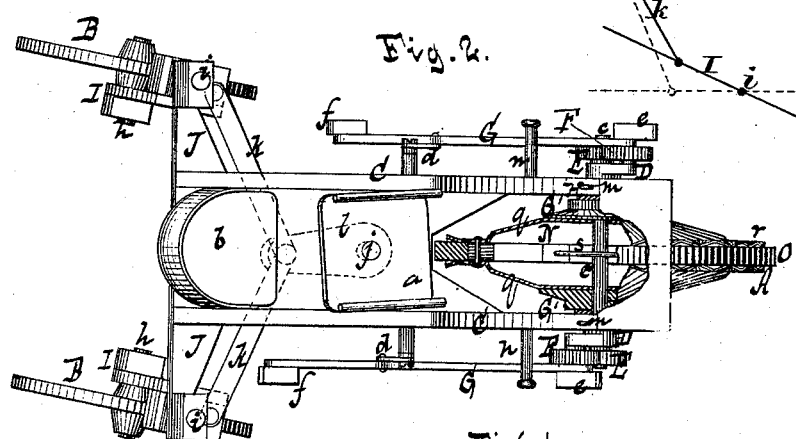
Figure 3:
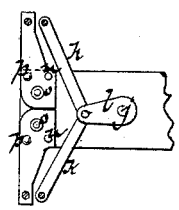
Figure 4:
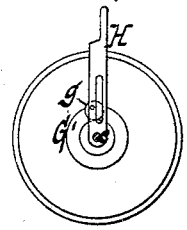

Figure 1 represents a side view, partly in section, of a velocipede embodying my invention. Fig. 2 is a plan or top view thereof, partly in section. Figs. 3 and 4 are detail views of parts. Fig. 5 is a diagram illustrating the positions of the parts when the vehicle is being steered.

Similar letters indicate corresponding parts.

My invention relates to velocipedes, some parts thereof being especially applicable to tricycles and four-wheel vehicles, while others are applicable both to tricycles and to bicycles; and it consists, first, in the combination, with the driving-wheel and its shaft projecting from the side thereof, and a reach connecting the front and rear wheels and provided with a seat, of a gear-wheel fixed on the end of the axle, a loose crank mounted on the axle and carrying at its outer end a fixed gear-wheel engaging with the gear upon the axle, and a lever pivoted to the axle, extending toward the seat and provided with a pedal, whereby a person occupying the seat may operate the lever with his foot for the purpose of driving the velocipede; second, in the combination, in a velocipede, of two steering-wheels mounted in independent oscillating supports with a steering-post, an arm moving with it, and rods connected with the wheel-supports, whereby, when the steering-post is actuated, the wheels are brought into different or non-parallel planes; third, in the combination, with the driving-wheel of a velocipede and with foot driving-gear adapted to act on said wheel, of a fixed pulley and oscillating hand-lever mounted on the wheel-axle, and a cam secured to the lever to adapt the same for actuating the pulley, as hereinafter more particularly described; fourth, in the combination, in a velocipede, of two steering-wheels mounted in independent oscillating supports and an oscillating seat connected to the supports of both wheels; fifth, in the combination, with the reach of a three-wheeled velocipede, of lateral projections, forming supports for the two parallel wheels, adapted to be folded inward; sixth, in the combination, with the frame of a velocipede, of a flexible shoulder-brace attached to the frame; seventh, in the combination, in a velocipede driving-wheel, of an elastic tire and a corrugated or indented rim, to prevent slipping of the tire.

In the drawings, the letter A designates the front or driving wheel, and B B the hind or steering wheels, of the vehicle, combined with a reach, C, which, in this example, is provided with two seats, *a b*.

At its opposite ends the axle *c* of the front wheel carries a crank, D, and a pulley, E, the crank being loose and the pulley fixed upon the axle, and to said crank is fastened a disk, F, which engages with the pulley E. In this example the pulley E and disk F are provided with teeth; but they may, if desired, be left plain, so as to act like friction-gear.

To the crank D, on the respective sides of the vehicle, is also fastened one end of a bar, G, which is hung on links *d*, attached to the reach C, so that it is capable of a reciprocating motion, and which is provided with two pedals, *e f*, one at each end. These pedals are placed above the centers of the disk E, the result of which is, that the leverage is increased with the forward and decreased with the backward motion. The wheel-axle *c* also carries a pulley, G', and a hand-lever, H, (best seen in Fig. 4,) one on each side of the wheel A, the pulley being fixed and the lever loose, so that the latter may oscillate, and to said lever is fastened a cam or dog, *g*, in such a manner that the cam is adapted to bear on the face of the pulley. In this example the pulley G' on each side of the wheel A is formed on the hub of the wheel.

The rear wheels, B B, have independent axles *h h*, and they are mounted in independent supports I I, which are connected to projections J J, pivoted to the reach C by means of a pivot, *i*, so that the supports are adapted to oscillate. These supports I I are both connected to a post, *j*, turning in the reach C in such a manner that the supports may be simultaneously actuated from or by means of said post; and for the purpose of making such connection I use reciprocating rods k k and a swinging arm, l, fixed to the post, stops u being combined with the rods to limit their movements.

To the upper end of the post j is fastened the forward seat, a, so that the post may be turned by means of this seat.

On its rear part the reach C is provided with lateral projections J J for the attachment of the wheel-supports I I. These projections J J are attached to the reach C by means of pivots o, (see Fig. 3,) on which they are capable of swinging, and they are held in their normal positions by pins p.

On the upper and forward part of the reach C are arranged two staples, m m, or other similar fastening devices, to which I connect the opposite ends of a flexible shoulder-brace, L.

In order to give motion to the driving-wheel A, power is applied to the crank D, whence it is transferred to the wheel-axle by the action of the disk F on the pulley E, and thence to the wheel. This motion may, if desired, be produced by a single rider, or by two, inasmuch as by the double seats a b and the bar G, with its double pedals e f, the vehicle is adapted for two riders, and both are enabled to act upon the crank D in unison without its being unfit for one rider. The bar G also allows the vehicle to be driven in either direction. If it is desired to turn the driving-wheel A by hand, the lever H is taken hold of and oscillated, during which motion the cam g alternately moves free of the pulley G' and grasps the same, so as to impart thereto a revolving motion, step by step.

The hand-lever H and its concomitants are intended to be used in connection with the usual driving-gear to assist in propelling the vehicle uphill. The back motion of the lever H is limited by means of a stop, n.

In order to adjust the hind wheels, B B, for the purpose of steering the vehicle, the post j is turned by means of the seat a—that is to say, this seat is swung in one or the other direction either by its occupant or by the occupant of the rear seat, b, when a like motion is given simultaneously to the supports I I of both wheels through the gearing between these supports and the post. When the post j is set to steer the vehicle the arm l moves with it, and the rods k act upon the wheel-supports I in such a manner as to bring the wheels B B in different or non parallel planes, as will be perceived by reference to the diagram shown in Fig. 5. This is due to the fact that as the swinging arm l moves sidewise the angle between one of the rods k and the wheel-supports is increased to a greater extent than the angle between the other rod and wheel-support, which latter is decreased. The result of this adjustment of the wheel-supports I is, that the axles of the two wheels B B always point to the center or axis of the curve through which the vehicle travels. Another result of the arrangement of the steering-wheels is, that a space is gained between them for the reception of a baggage-van.

Instead of the seat a, the usual post and handles may be used for the purpose of actuating the steering-gear.

The arrangement of the lateral projections J J allows the same to be turned or folded inward, together with the wheel-supports I I and the rear wheels, and by this means the width of the vehicle can be materially reduced, so as to facilitate transportation.

The brace L is intended to be adjusted over the shoulders of the rider occupying the seat a, and serves to sustain the upper portion of his body, thereby promoting his comfort and giving him improved leverage.

The driving-wheel A consists of two disks, q, instead of spokes, for the purpose of resisting torsion, which disks are concave and are secured to a felly, N, with their cavities facing each other, while they each carry a boss to form the wheel-hub. The felly N is made of less diameter than the disk q, so that a space is left outside of the felly between the disks. Into this space I introduce an india-rubber tire, O, and for the purpose of holding this tire in position I corrugate or indent the edges of the disks, as at r. The felly N is made in sections and of wood and metal, one material being made to alternate with the other, and the metal sections are sustained by braces s, projecting from the wheel-axle c. If desired, the india-rubber tire O may be omitted, and in that case the felly N is made to project out beyond the edges of the disks q, so as to form the rim of the wheel.

In Fig. 1 I have shown the seat a as being provided with a reversible strap or back-rest, t. This strap is to be used instead of or in connection with the shoulder-brace L, and by being reversible it is made capable of supporting the rider, whether he sits in the position indicated or in a reverse position.

If desired, the disk F may be enlarged, the rim hollowed out, and the pulley E arranged within it.

What I claim is—

1. In a velocipede, the combination, with the driving-wheel and its shaft projecting from the side thereof, and a reach connecting the front and rear wheels and provided with a seat, of a gear-wheel fixed on the end of the axle, a loose crank mounted on the axle and carrying at its outer end a gear-wheel engaging with the gear upon the axle and fixed to a lever pivoted to the crank, said lever extending toward the seat, and being provided with a pedal, whereby a person occupying the seat may operate the lever with his foot for the purpose of driving the velocipede.

2. The combination, in a velocipede, of two steering-wheels mounted in independent oscillating supports with a steering-post, an arm moving with it, and rods connected with the wheel-supports, substantially as described, whereby when the steering-post is actuated the wheels are brought into different or non-parallel planes, as and for the purpose set forth.

3. The combination, with the driving-wheel of a velocipede and with foot driving-gear adapted to act on said wheel, of a fixed pulley and oscillating hand-lever mounted on the wheel-axle, and a cam secured to the lever to adapt the same for actuating the pulley, substantially as described.

4. The combination, in a velocipede, of two steering-wheels mounted in independent oscillating supports and an oscillating seat connected to the supports of both wheels, substantially in the manner and for the purpose set forth.

5. The combination, with the reach of a three-wheeled velocipede, of lateral projections, forming supports for the two parallel wheels, adapted to be folded inward, substantially as and for the purpose described.

6. The combination, with the frame of a velocipede, of a flexible shoulder-brace attached to the frame, substantially in the manner and for the purpose described.

7. The combination, in a velocipede driving-wheel, of an elastic tire and a corrugated or indented rim to prevent slipping of the tire, substantially as described.

In testimony that I claim the foregoing I have hereunto set my hand and seal this 13th day of May, 1879.

ARTHUR M. ALLEN. [L. S.]

Witnesses:
 W. HAUFF,
 CHAS. WAHLERS.